(12) United States Patent
Ellsworth et al.

(10) Patent No.: US 8,620,905 B2
(45) Date of Patent: Dec. 31, 2013

(54) PROXIMITY-BASED METHOD FOR DETERMINING CONCEPT RELEVANCE WITHIN A DOMAIN ONTOLOGY

(75) Inventors: Joseph Ellsworth, Bainbridge Island, WA (US); Michael Ree, Seattle, WA (US); James Helms, Bellevue, WA (US); Jarett Funnell, Lake Stevens, WA (US)

(73) Assignee: Corbis Corporation, Seattle, WA (US)

( * ) Notice: Subject to any disclaimer, the term of this patent is extended or adjusted under 35 U.S.C. 154(b) by 0 days.

(21) Appl. No.: 13/449,716

(22) Filed: Apr. 18, 2012

(65) Prior Publication Data

US 2013/0254184 A1    Sep. 26, 2013

Related U.S. Application Data

(60) Provisional application No. 61/614,413, filed on Mar. 22, 2012.

(51) Int. Cl.
*G06F 17/30* (2006.01)

(52) U.S. Cl.
CPC .................. *G06F 17/30038* (2013.01)
USPC ........................................... 707/722

(58) Field of Classification Search
CPC ................................. G06F 17/30038
USPC ........................................... 707/722
See application file for complete search history.

(56) References Cited

U.S. PATENT DOCUMENTS

2006/0074632 A1* 4/2006 Nanavati et al. ............ 704/9
2006/0074900 A1* 4/2006 Nanavati et al. ............ 707/5
2008/0133509 A1* 6/2008 Nanavati et al. ............ 707/5

FOREIGN PATENT DOCUMENTS

WO    WO 2007113546 A1 * 10/2007

OTHER PUBLICATIONS

Hyvonen et al., Intelligent Image Retrieval and Browsing Using Semantic Web Techniques—A Case Study, Sep. 2003, Helsinki Institute for Information Technology (HIIT)/University of Helsinki, 16 pages.*
"Explore images with Google Image Swirl, now in Labs" (Nov. 2009) Google Official Blog, 2 pp.
"Similar Images graduates from Google Labs" (Oct. 2009) Google Official Blog, 2 pp.

* cited by examiner

*Primary Examiner* — Apu Mofiz
*Assistant Examiner* — Dara J Glasser
(74) *Attorney, Agent, or Firm* — Soquel Group LLC

(57) ABSTRACT

Embodiments are directed towards providing a device and method of identifying media items from a media library maintained by a media server that are similar to a designated media item. The media server stores a controlled vocabulary which is represented as a hierarchically linked set of nodes wherein a plurality of nodes correspond to concepts and a library of media items. Each media item corresponds to a record in the media library and the record includes at least one metadata field with assigned keywords. The media server receives a designation of a media item from a user computer, retrieves the keywords assigned to the media item, obtains all related concepts from the controlled vocabulary, computes a search weight for each related concept, and queries the media library to identify media items that match the designated media item and provides the results to the user computer.

10 Claims, 13 Drawing Sheets

420 — [From]
ConceptsHigh=2.75
ConceptsNormal=2
ConceptsLow=1

422 — [To]
ConceptsHigh=2.75
ConceptsNormal=2
ConceptsLow=1
Title=.5
Caption=.25

424 — [CV]
250838=.75; People
4=12; Specific people
36335=1.75; Nobody
15=1.5; Number of people
2428=0; Animals
5681=5; Chordates
37539=5; invertebrates
31546=1; Number of animals
4455=1; General plants

*FIG. 4B*

730
Obtain
Assigned Weights from
CV Tree
(Step 640 of FIG. 6)

| ID | Node Name | Assigned Weight |
|---|---|---|
| 250838 | People | 0.75 |
| 251333 | Top | 0.25 |
| 250890 | Objects | 1 |

740
Compute
Node Weights
(Step 640 of FIG. 6)

| Node Name | Dist to Top | Total Dist | Nearest Weight | Node Weight |
|---|---|---|---|---|
| Pin (fastener) | 1 | 2 | 1 (Objects) | 0.5 |
| Safety Pin | 2 | 2 | 1 (Objects) | 1 |
| Cultural Artifacts | 1 | 1 | 0.25 (Top) | 0.25 |
| Nobody | 1 | 1 | 0.75 (People) | 0.75 |

*FIG. 7B*

750
Obtain
Weights for
Search From & Search
To Fields
(Step 645 of FIG. 6)

| Search From | Search From Weight |
|---|---|
| ConceptsHigh | 3 |
| ConceptNormal | 2 |
| ConceptLow | 1 |

| Search To | Search To Weight |
|---|---|
| ConceptsHigh | 3 |
| ConceptNormal | 2 |
| ConceptLow | 1 |
| Title | 0.5 |
| Caption | 0.25 |

760
Compute
Search Weights
For Each
Concept
(Step 645 of FIG. 6)

760a: Safety Pin (NW=1), Assigned to ConceptsHigh

| Search Field | Average of (Search From + Search To) | Node Weight | Search Weight |
|---|---|---|---|
| ConceptsHigh | ((3 + 3) / 2) | 1 | 3 |
| ConceptsNormal | ((3 + 2) / 2) | 1 | 2.5 |
| ConceptsLow | ((3 + 1) / 2) | 1 | 2 |
| Title | ((3 + 0.5) / 2) | 1 | 1.75 |
| Caption | ((3 + 0.25) / 2) | 1 | 1.625 |

760b: Cultural Artifacts (NW=0.25), Assigned to ConceptMedium

| Search Field | Average of (Search From + Search To) | Node Weight | Search Weight |
|---|---|---|---|
| ConceptsHigh | ((2 + 3) / 2) | 0.25 | 0.625 |
| ConceptsNormal | ((2 + 2) / 2) | 0.25 | 0.5 |
| ConceptsLow | ((2 + 1) / 2) | 0.25 | 0.375 |
| Title | ((2 + 0.5) / 2) | 0.25 | 0.3125 |
| Caption | ((2 + 0.25) / 2) | 0.25 | 0.28125 |

*FIG. 7C*

PROXIMITY-BASED METHOD FOR DETERMINING CONCEPT RELEVANCE WITHIN A DOMAIN ONTOLOGY

PRIORITY REFERENCE TO RELATED APPLICATIONS

This application claims benefit of U.S. Provisional Application No. 61/614,413, entitled "A Proximity-Based Method For Determining Concept Relevance Within A Domain Ontology", filed on Mar. 22, 2012 by inventor Joseph Ellsworth, et al.

TECHNICAL FIELD

Various embodiments generally relate to a method and system for improving the relevance of search results in a digital media system. In particular, embodiments identify digital media items that are relevant or similar to a designated digital media item stored in a digital media library based on the proximity of terms within an ontology.

BACKGROUND

Online digital media systems enable users to search for, select, obtain pricing for and license digital media items for personal and commercial use. Uses for digital media items include commercial uses such as advertising, corporate events, incorporation into print publications such as newspapers and magazines, incorporation into online publications such as websites and blogs and personal uses, such as viewing movies and listening to music at home.

Digital media generally includes, but is not limited to, images, pictures, videos, illustrations, drawings, graphics, symbols, text, and audio recordings. Typical users of such content for commercial purposes include advertisers, publishers, media companies, graphic designers, editors, art directors, artists, writers, and the like.

Typically, users search for digital media items using search tools provided by an digital media system (DMS) across a network. For example, a Web-based user interface may be provided. Searches may take advantage of the media data, e.g. image, music or video data, or may take advantage of metadata or tags, which is descriptive information about individual media items. Metadata may be supplied by the capture or recording equipment, e.g. digital camera, or may be provided by the operator of the DMS or the owner, or contributor, of the media items.

To improve the accuracy of search a domain ontology, or controlled vocabulary, that hierarchically relates different concepts or keywords may be used. In such an approach, search terms entered by a user in a search box are automatically mapped by the DMS to keywords or concepts within the controlled vocabulary to improve consistency of data and accuracy of results. DMSs typically employ human editors, or reviewers, to add and edit metadata and to maintain a controlled vocabulary.

One method for finding digital media items within a DMS is to retrieve and display to the user search results that are similar or related to a media item designated by a user. For example, if a user selects a digital photo depicting a small dog then the DMS may provide a user interface control that the user can select to indicate that he/she wants to see additional photos that are similar to the designated or selected photo. In this case, additional photos of small dogs would be retrieved and displayed by the DMS.

In a typical search system, such as that provided by GOOGLE INC. of Mountain View, Calif., a "find similar" tool relies on data that it has collected regarding a media item, such as a digital photo or a web page, to identify similar items. Such collected information may include the number of users that have clicked on the media item, demographic information about the users that clicked on the item and the like. In contrast, a DMS which relies on human reviewers creates and maintains high quality metadata for media items in its digital media library. Thus, it would be desirable to improve relevancy of results generated by a "find similar" tool by taking into account such metadata.

SUMMARY OF THE DESCRIPTION

Various embodiments are directed towards a method and system for improving the relevance of search results in a digital media system. In particular, embodiments enable digital media items that are relevant or similar to a selected digital media item to be identified from within a digital media library based on a weighted proximity of terms within an ontology.

In one embodiment a domain ontology is maintained that hierarchically relates a controlled vocabulary of concepts, or terms. Each concept corresponds to a concept node in a controlled vocabulary tree (CV tree). Weights may be assigned to concepts that indicate the importance of the concept as a search term.

In a further embodiment, the controlled vocabulary also includes placeholders and each placeholder corresponds to a placeholder node in a CV tree. Further, weights may be assigned to placeholders.

Further, in one embodiment, concepts related to keywords assigned to a designated media item are identified using a hierarchically related controlled vocabulary. In a further embodiment, node weights are calculated for each related concept. A query is formulated for each related concept. When executed, the query returns a search score for a media item that assesses the degree to which the media item matches the query. Then search weights, based on the node weights, are calculated and used to weight the search scores that result from the queries. Finally, a list of up to a specified number of highest scoring media items is provided to a user via a user computer.

In one embodiment, node weights are inversely related to the distance between a related concept and a designated concept such that the closer in proximity within the CV tree a related concept is to a designated concept the larger is its node weight.

In another embodiment, concepts related to keywords assigned to a designated media item are identified using a hierarchically related controlled vocabulary. Then, the related concepts are provided to a user computer that enables a user to adjust a node weight for each related concept that indicates the relative importance of the related concept in identifying media items similar to the designated media item. A query is formulated for each related concept. When executed, the query returns a search score for a media item that assesses the degree to which the media item matches the query. Then search weights, based on the node weights, are calculated and used to weight the search scores that result from the queries. Finally, a list of up to a specified number of highest scoring media items is provided to a user via a user computer.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein:

FIG. 4B is an embodiment of a configuration file that assigns weights to nodes in a controlled vocabulary.

FIGS. 7A-C provide an example of selected steps performed by a DMS to formulate search requests to a search engine in order to identify digital media items that are similar to a designated digital media item.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Media item—means a unit of information that can be searched for in a digital media system (DMS). Example media items include inter alia a photo or digital image, a song, a record album or CD, a movie and a video.

Digital media item—while the present invention pertains to media items stored in analog or digital format, in some cases the invention handles a media item in digital format specifically, in which case it is referred to as a digital media item. A digital media item may be searched for, viewed, played, downloaded across a network and licensed. Digital media includes digital photographs, commonly referred to as "digital images" or simply "images", digital videos, digital music and digital sound files, vector art, animation files such as ADOBE FLASH files, and the like. For embodiments discussed herein, digital media items may comprise content that was originally created digitally, or content that was converted from analog to digital format.

Figure 1:
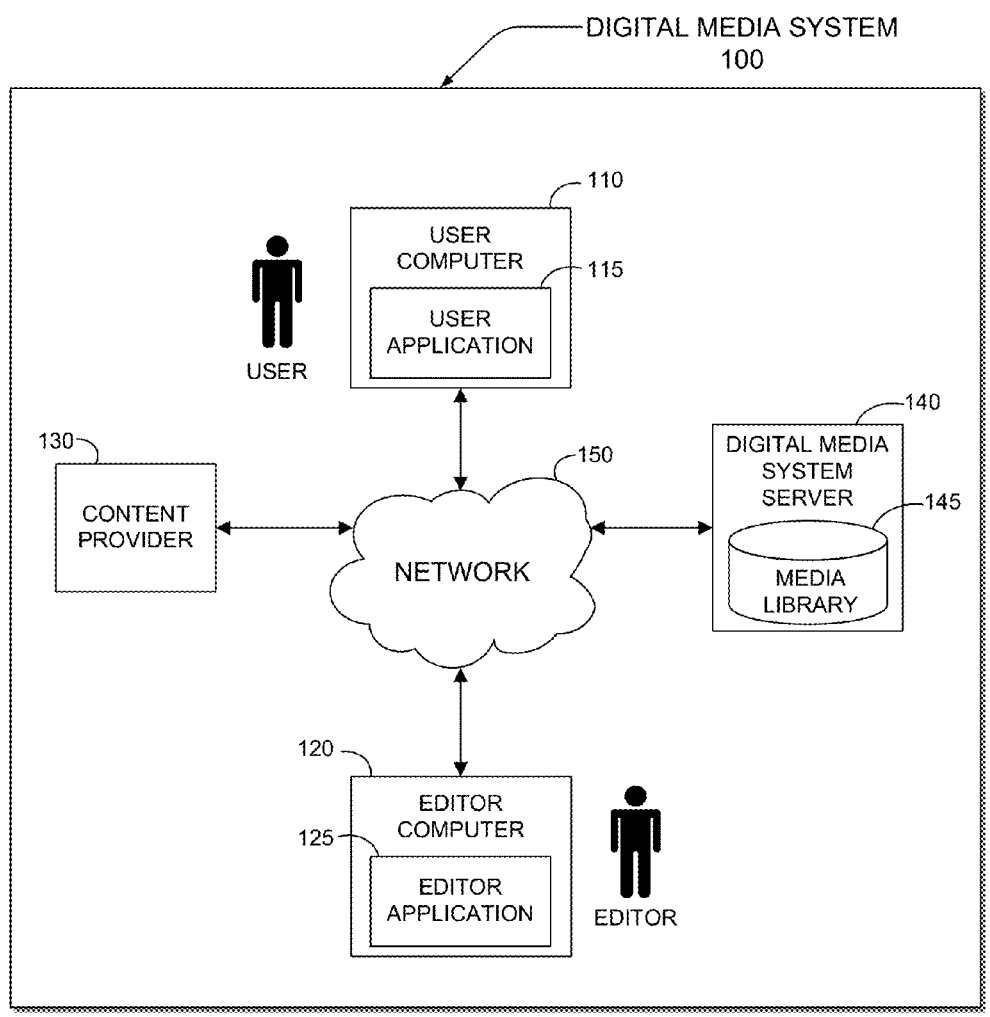
FIG. 1 is a generalized block diagram of a preferred embodiment of an online digital media system (DMS) in which a digital media server (DMS server) enables a user to search for digital media items that are similar to a designated digital media item.

Media library—means a collection of media items, or references to media items, provided by a digital media system that are available for searching, viewing or playing and potentially licensing users. The digital media system described herein with reference to FIG. 1 provides such a media library. Examples of media libraries include a stock photo library, a stock video library, and a music library.

Content provider—means a person or entity that provides media items, or information about media items to a digital media system for inclusion in a media library. A contributor may be an owner of the digital media items or a representative of an entity that owns the digital media items.

Digital media system—is a system that maintains a digital library of media items and makes the media items available to users across a network for uses such as viewing, playing, searching, browsing, downloading and licensing.

User—means an individual that uses a mobile device, PC or other electronic device to access and use the services provided by a DMS.

Search term—means a word, words, phrase or phrases entered by a user, typically into a search entry box.

Keyword—means the terms assigned to a media item by an editor that are maintained by a DMS along with the media item. The keywords may or may not be the same as the keywords provided by the contributor of the media item to a DMS. A keyword maps or corresponds to a single concept, thus the terms keyword and concept can be used interchangeably.

Concept—refers to an idea that corresponds to one or more words in a controlled vocabulary and to a single node in a CV tree. A concept is language independent; thus in order to be expressed in a particular language it must be translated into one or more words in the language. Typically, when a concept is assigned to a media item it is assigned as a language dependent keyword. In a preferred embodiment, each keyword assigned to a media item corresponds to one concept.

Controlled vocabulary, or CV, domain ontology, or simply ontology, taxonomy—As used herein, in a preferred embodiment, a CV is a vocabulary of concepts and placeholders that are hierarchically related. In another embodiment, all nodes are concept nodes.

CV tree—refers to a data structure that implements a controlled vocabulary in which nodes that are linked hierarchically to other nodes. In one embodiment, described herein, each node has a single parent, except the topmost node which is referred to as Top, and a node may have zero or more children. In one embodiment, a node may be either a concept node or a placeholder node, where a placeholder refers to a class or group of concepts. Generally, concepts whose nodes are higher in the CV tree are more general while concepts whose nodes are lower in the CV tree are more specific. An example of a CV tree is described hereinbelow with reference to FIG. 2.

Ontology, Taxonomy, Domain Ontology—Taken together, the concepts, placeholders and the hierarchical relationships between the placeholders and concepts are referred to as a taxonomy or an ontology. A domain ontology refers to a taxonomy or ontology that is specific to a domain or usage.

Metadata—refers to information that describes, or provides information supplemental to, a digital media item. Metadata includes, inter alia, title, caption, subject, description, keywords, date created, dated edited, category, license category, price. Metadata may be included within the digital media files or stored separately in a database. Note that metadata refers to information that is intrinsic to the media asset such as its known subject, keywords that describe the media content, color model, media owner, media copyright holder, file format, and other information provided by a content provider or readily determined from the digital media content. Metadata may also refer to information that has been assigned to the media content such as content category, or model or property release. Metadata typically enables or improves searching, browsing, filtering, matching and selection of media. Metadata is sometimes referred to as tags. For example, the ID3 industry standard defines metadata, commonly referred to as tags, for sound audio files in the common formats such as MPEG-1 Audio Layer 3 (MP3) format. ID3 tags include title, album, artist, year and comment. The ID3 standard is maintained by ID3.ORG. The ID3 specification and other information can be found on the web at http://www.id3.org/.

Some of the examples provided herein are constrained to digital images. However, the methods, processes, and systems described herein can be applied to other types of media items, including, inter alia, music and sound, video, movies, graphics, web pages, book, articles and other text documents.

Generalized Operation

The operation of certain aspects of the invention is described below with respect to FIGS. 1-9.

FIG. 1 is a generalized block diagram of a preferred embodiment of an online digital media system (DMS) 100 in which a DMS server 140 enables a user to search for, browse and select one or more digital media items for an intended use such as viewing, playing, downloading, or licensing. A user accesses the services provided by a DMS server 140 using a user application 115 that runs in a user computer 110. User application 115 is described in further detail hereinbelow with reference to FIGS. 3A-B.

Generally, DMS server 140 provides services across a network 150 to a user using user computer 110, an editor using editor computer 120, and a content provider 130. DMS server 140 also manages a library of media items, referred to as media library 145. DMS server 140 provides media items in media library 140 for searching, browsing and licensing by users. In some embodiments, media items are stored in media library 145 in digital format, as digital media items, and can be downloaded for use after a user first secures a license to use the digital media item. In other embodiments, media library 145 does not store the media item and these are obtained separately by the user, i.e. they are not provided by the DMS.

Media library 145 stores a record for each digital media item included in the library. The records typically include metadata that describe qualities of the media items. In one embodiment, each record is a database record and includes fields such as those listed and described below in Table 1.

TABLE 1

Media Library Fields For A Media Item

| Name Of Field | Description |
| --- | --- |
| Unique ID | Unique identifier for the media item. Used as key to access database information about the media item. |
| Title | Title of media item. |
| Caption | A text description of the media item. |
| Artist | Person or persons that created the media item. |

TABLE 1-continued

Media Library Fields For A Media Item

| Name Of Field | Description |
| --- | --- |
| Keywords | Keywords assigned by a user or contributor to the media item. |
| ConceptsHigh | Keywords or concepts of high importance to the media item assigned by an editor. Correspond to concepts in a CV tree. |
| ConceptsNormal | Keywords or concepts of low importance to the media item assigned by an editor. Correspond to concepts in a CV tree. |
| ConceptsLow | Keywords or concepts of low importance to the media item assigned by an editor. Correspond to concepts in a CV tree. |
| Access Info | Information about how to access the corresponding media item. |

Typically, information about a media item to be included in media library 145 is provided by content provider 130 who typically owns the media item or represents one or more owners or rights holders in the media item.

In one embodiment, an editor 120 uses an editor application 125 running on a editor computer 120 to edit and assign metadata to media items and to maintain a controlled vocabulary. Editor application 125 may be used to assign and edit keywords, to edit concepts and placeholders, to or add weights to concepts and placeholders in a controlled vocabulary or to edit individual entries in a controlled vocabulary. Editor application 125 is further described hereinbelow with reference to FIGS. 4A-B.

Figure 2:
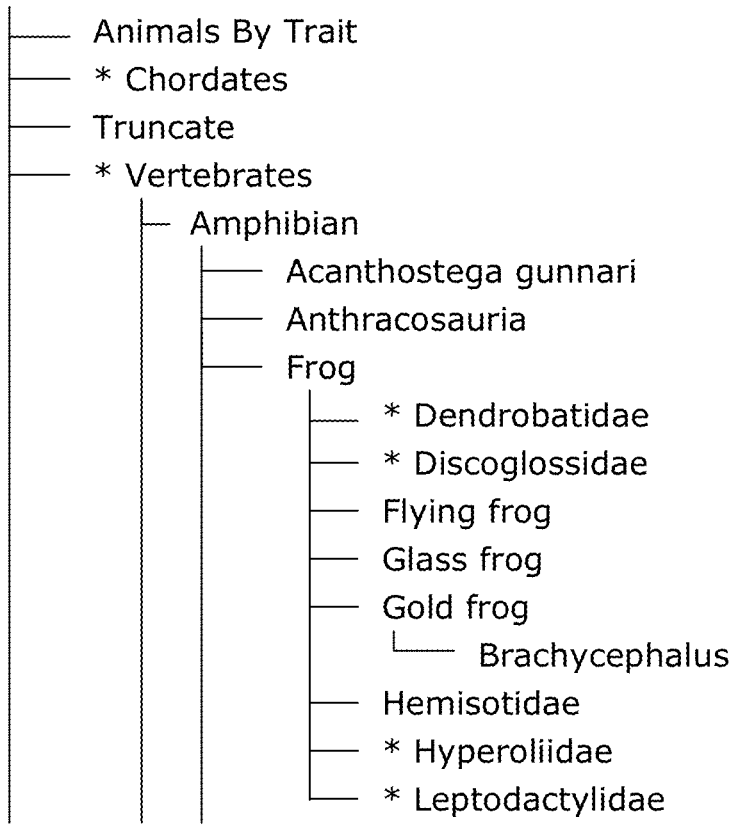
FIG. 2 illustrates a portion of an embodiment of a hierarchical controlled vocabulary.

FIG. 2 illustrates a portion of an embodiment of a hierarchical controlled vocabulary. Each line includes a word, words or phrase that represents a single node in a hierarchical controlled vocabulary, referred to henceforth as a CV tree. Each node is either a placeholder node or a concept node. Placeholder nodes start with the symbol "*" (star). Thus the chordates, vertebrates, dendrobatide, etc. are placeholder nodes while the animals, animals by trait, truncate, amphibian, etc. are concept nodes. In one embodiment, an editor assigns keywords to a digital media item by assigning the keywords to specific metadata fields in a record in media library 145 that corresponds to the digital media item. In a preferred embodiment, each assigned keyword corresponds unambiguously to a single concept. For example, the keyword "frog" for which there is a corresponding concept "frog" can be assigned by an editor as a keyword for an image, but the term vertebrates, which is a placeholder, can not be assigned. A distinction between a concept and a keyword is that the concept frog is language independent, thus an editor working in the French language might assign a keyword "grenouille", the French translation for frog.

A subpath from a concept node to the Top node of the depicted portion of the CV tree may be expressed as:

Flying
    frog→Frog→Amphibian→*Vertebrates→Animals

In this example, there are four concepts (Flying frog, Frog, Amphibian, Animals) and one placeholder (Vertebrates) in the path from Flying frog to Animals.

Figure 3A:
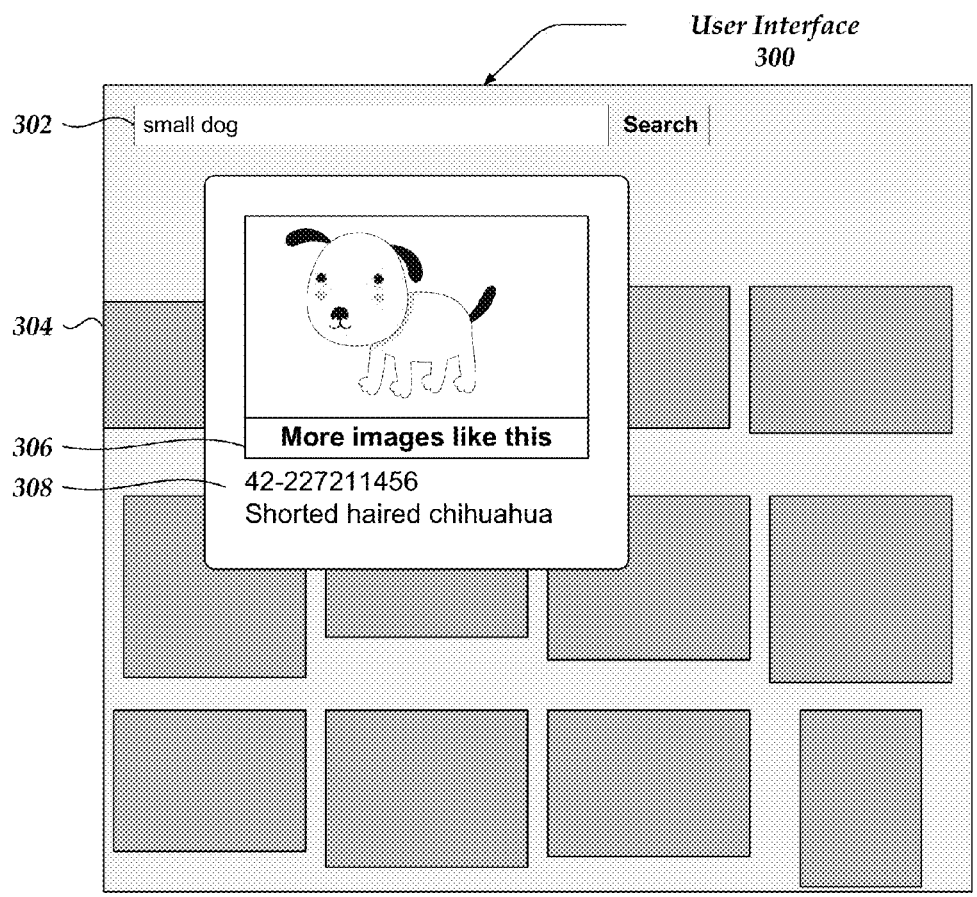
FIG. 3A illustrates one embodiment of a user interface that enables a user to request to view digital media items similar to a designated digital media item.
Figure 3B:
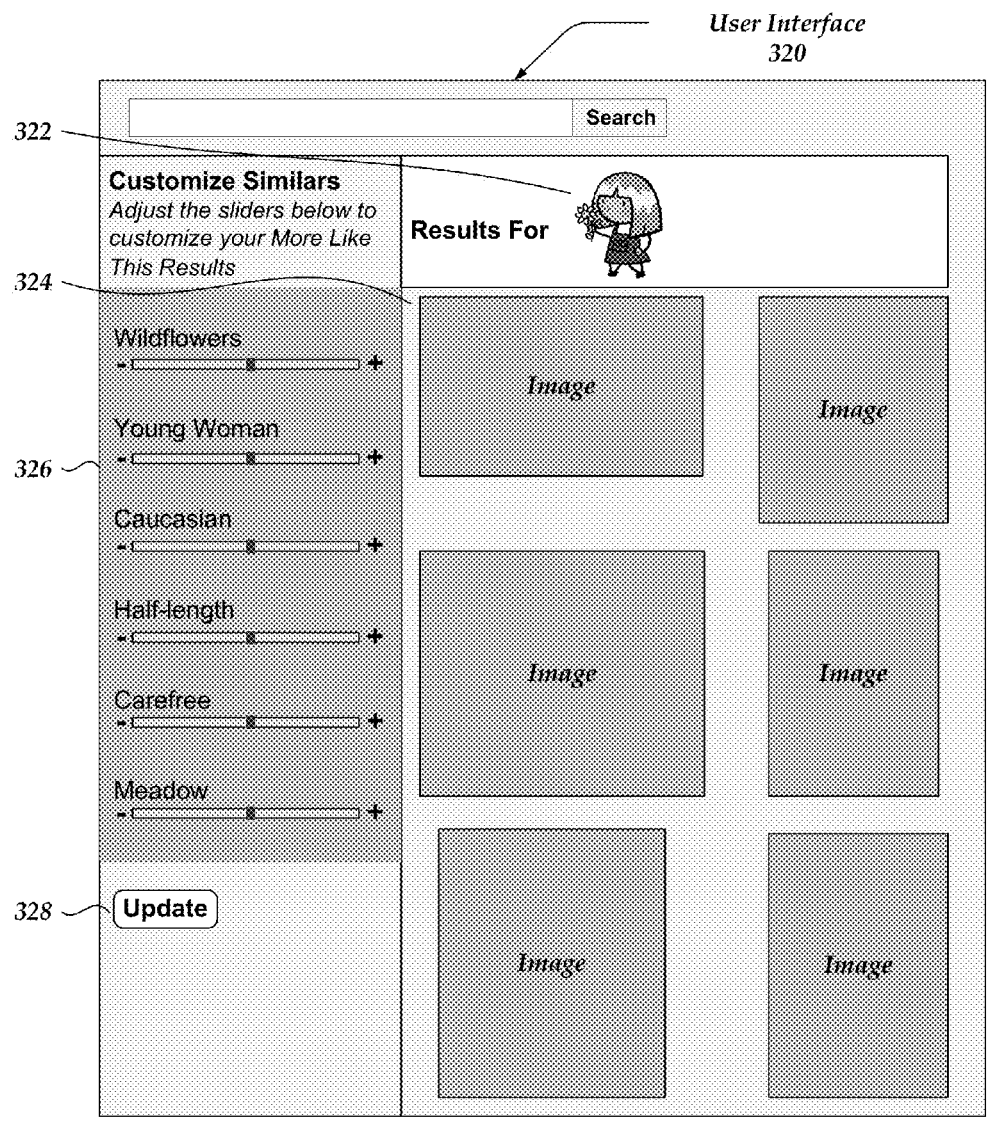
FIG. 3B illustrates an embodiment of a user interface that enables a user to adjust weights for concepts related to a designated media item.

FIGS. 3A-B are embodiments of the user interface provided to a user by user application 115 running in user computer 110. In one embodiment, each of FIGS. 3A-2B correspond to an interactive Web page that is provided by DMS server 140 to user computer 110 to be provided to a user by user application 115.

FIG. 3A illustrates one embodiment of a user interface 300 that enables a user to request to view digital media items similar to a designated digital media item. A search box 302 enables a user to enter search terms to be used by DMS server 140 to perform a search. After performing the search, DMS server 140 provides a list of media items that match the search terms to user application 115 for display to the user. User application 115 displays the matching media items in a search results window 304. In this example, the user entered search terms "small dog" in search box 302 and search results window 304 displays thumbnails, depicted as shaded boxes, that represent digital images in media library 145 that match the search terms.

The user may select a thumbnail from search results window 304 for viewing. In response, an image panel 306 displays. Image panel 306 includes a "more like this" (MLT) control 308, as well as selected metadata, such as the title and identifier. If the user selects MLT control 308, user application 115 sends a request to DMS server 140 to retrieve more images like the image depicted or designated by thumbnail 306.

FIG. 3B illustrates an embodiment of a user interface that enables a user to adjust weights for concepts related to a designated media item. In FIG. 3B, the user has designated an image, represented by image thumbnail 322. Such an interface is used in the more-like-this algorithm described with reference to FIG. 6 hereinbelow to adjust node weights for related concepts. The search results are depicted as image thumbnails in search results window 324 in which the grey rectangular boxes marked "Image" denote thumbnails of related images.

A set of sliders appear in customize similars panel 326. Each slider in panel 326 may be used to adjust a weight to be associated with a keyword or concept. As previously discussed, keywords are typically assigned by a human editor using editor application 125. However, the invention is not so limited and any process by which keywords are assigned to a media item is acceptable. For example, keywords may be included in metadata supplied by content provider 130. For simplicity it is assumed in the following discussion that each keyword corresponds to a single concept as is the case when an editor selects keywords from a controlled vocabulary. However, in other embodiments, keywords assigned to an image may not be in one-to-one correspondence with concepts and it may be necessary to map each keyword to its closest concept in a controlled vocabulary.

A user may adjust each slider to increase the weight, or emphasis, that will be given to the corresponding concept when DMS server 140 performs the MLT algorithm to identify similar media items, discussed hereinbelow with reference to FIGS. 6-7. When the user finishes adjusting the sliders he/she selects an update control 328 and editor application 125 sends a message to DMS server that includes the updated weights, as specified by the sliders. It may be appreciated that any control that enables a user to specify a weight may be used; i.e. the invention is not limited to the use of sliders. For example, a pull down menu, or entry field may be used.

Figure 4A:
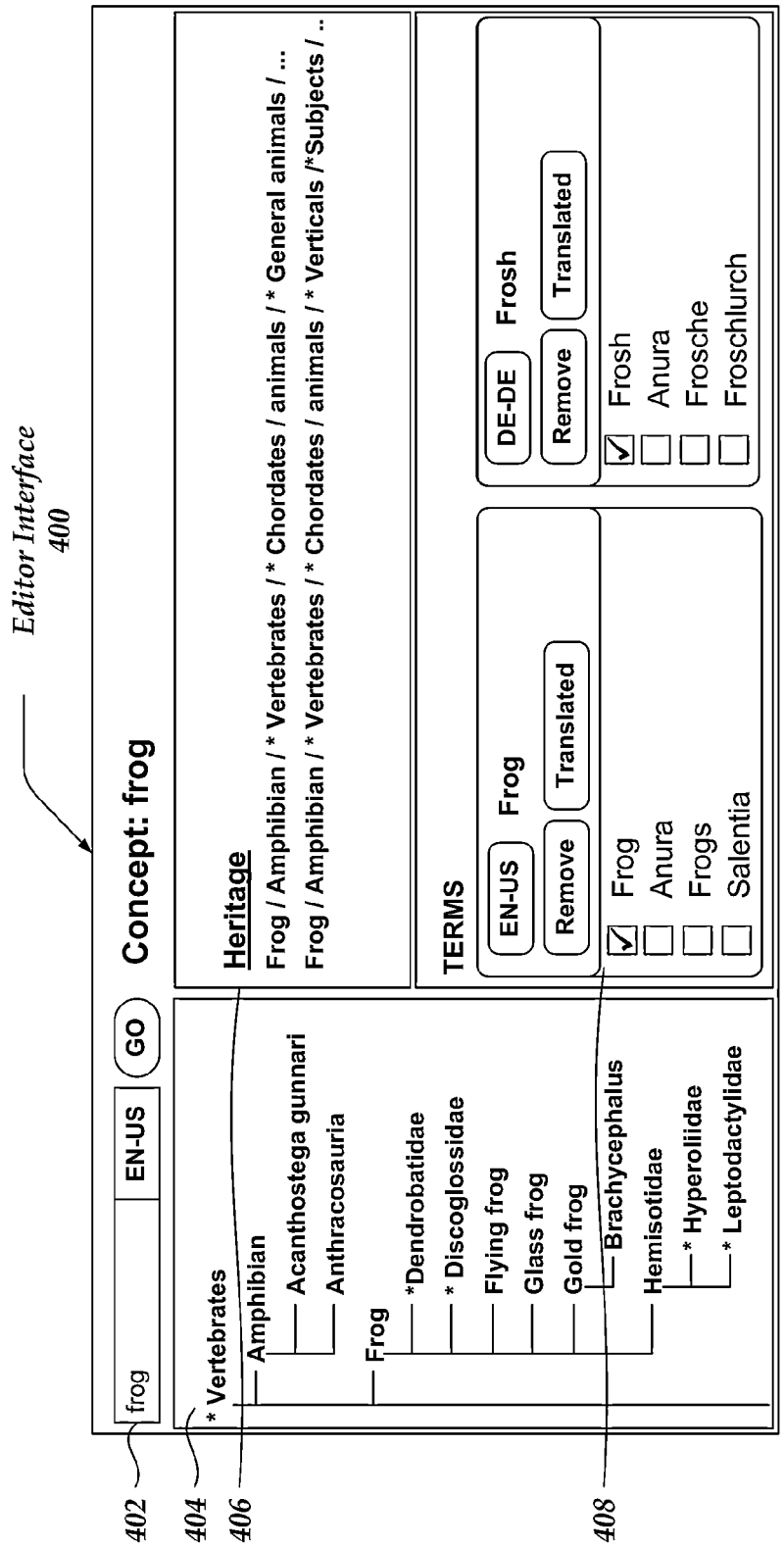
FIG. 4A is an embodiment of a user interface used by an editor to maintain a controlled vocabulary.

FIG. 4A is an embodiment of a editor interface 400 used by an editor to maintain a controlled vocabulary. A node box 402 displays the name of the concept that is currently selected. The editor can select which language is used to display the concept name. A tree panel 404 illustrates the hierarchic relationship between nodes and a symbol in front of the node name indicates if the node is a concept or a placeholder. An editor can select a node from tree panel 404 for editing.

A heritage panel 406 indicates the entire path from the selected node to the Top node. If there is more than one path then multiple paths are displayed. Controls provided with heritage panel 406 enable the editor to move a portion of the path to another location in the CV tree. Alternatively, the editor can remove one or more paths.

A term panel 408 enables an editor to view, edit, remove individual terms or nodes. For example, term panel 408 enables the editor to view and edit the node name in different languages, and to view and edit synonyms for the selected node. In one embodiment, term panel 408 enables the editor assign weights to concepts and placeholders.

FIG. 4B is an embodiment of a configuration file that assigns weights to nodes in a controlled vocabulary. In one embodiment, an editor assigns weights to nodes using editor interface 400; while in another embodiment weights are input using a configuration file such as that embodied in FIG. 4B. Weights are used in the MLT algorithm which is described hereinbelow with reference to FIGS. 6-7. A From section 420 indicates the weight to be applied depending on whether an editor assigns a keyword to the ConceptsHigh, ConceptsNormal or ConceptsLow fields. In one embodiment, an editor indicates whether a keyword is of high, normal, or low importance. The weight corresponding to this choice is taken from assignments in From section 420.

A To section 422 indicates a search-to weight to be applied when searching metadata fields in records in media library 145, i.e. To refers to the fields of the media item record being searched. In one embodiment, the metadata fields searched are ConceptsHigh, ConceptsNormal, ConceptsLow, Title, and Caption. An embodiment of the metadata fields for a media item are given in Table 1.

A CV section 424 indicates weights to be assigned to various nodes in the CV tree. In this example, the concept "Animals", with ID 2428 is assigned a zero (0) value.

Figure 5:
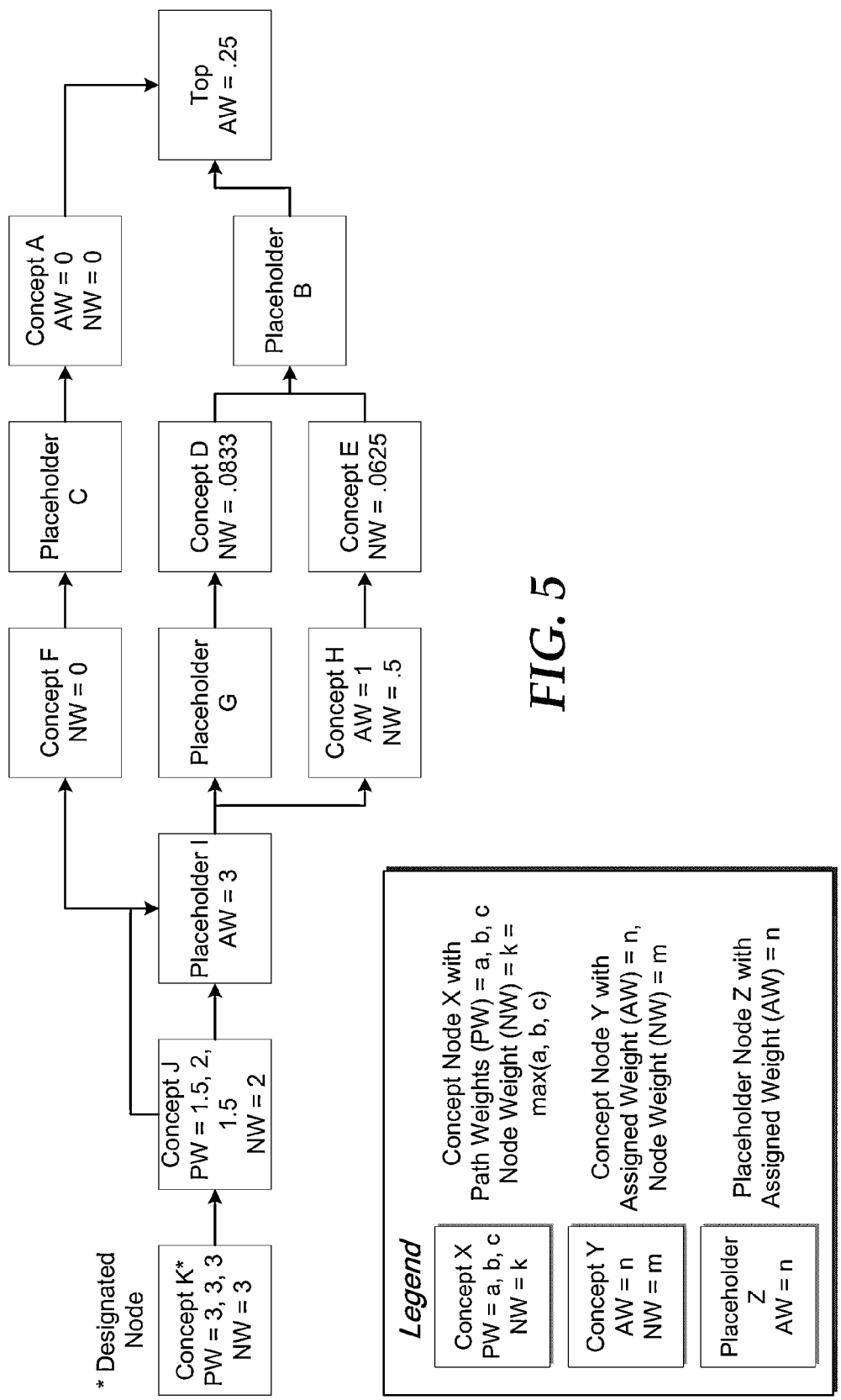
FIG. 5 provides an example of how concepts are related to an assigned keyword and how node weights are computed for the related concepts.

FIG. 5 provides an example of how concepts are related to an assigned keyword and how node weights are computed for the related concepts. Identifying related concepts and computing node weights are two of the steps in the more-like-this (MLT) algorithm described hereinbelow with reference to FIG. 6. The algorithm takes as its seed, or starting point, a designated concept or designated concept node in the CV tree. The designated node typically corresponds to a keyword assigned to a media item that has been selected, or designated, by a user. For this reason, the term designated node may also be referred to as the designated concept. The algorithm (1) harvests, or retrieves, concepts that are related to the designated concept, and (2) assigns node weights to the designated concept and to each harvested concept, collectively referred to as "related concepts". The computed node weights and related concepts are used subsequently in the MLT algorithm to generate a series of queries that are used to search media library 145 for media items that are similar to the designated media item. The algorithm has the goals of (1) identifying all concepts in paths from a designated concept to the top node and weighting concepts that are closer in distance to the designated concept, as measured by hops, higher than concepts that are further in distance, (2) basing the weight values on the weights assigned to various nodes in the CV tree, and (3) operating over a poly-hierarchical CV tree structure in which there may be multiple paths from a node to the topmost node (referred to as Top). An additional benefit of this approach is that it is not necessary to assign weights to each node. Thus, editors that maintain the CV tree can assign weights only to nodes where they have supporting user data or other valid information to support assigning a particular value to a node.

In this example, the designated concept is Concept K. There are three paths from Concept K on the left to the Top node at the right. Each node in the CV subtree is depicted as a rectangle with a node name, e.g. Concept J, Placeholder I.

Each node is either a concept node or a placeholder node. For some nodes, weights have been directly assigned, for example by an editor or through the use of a configuration file such as that depicted in FIG. 4B. Those nodes that have assigned weights have a value AW indicated below the node name.

One or more path weights (PW) are calculated for each concept. For each concept a path weight is calculated for each different path from the concept to the Top. Thus, for Concept K three path weights are calculated, each computed for a different path from K to Top as follows:

$$K \rightarrow J \rightarrow I \rightarrow F \rightarrow C \rightarrow A \rightarrow Top$$

$$K \rightarrow J \rightarrow I \rightarrow G \rightarrow D \rightarrow B \rightarrow Top$$

$$K \rightarrow J \rightarrow I \rightarrow H \rightarrow E \rightarrow B \rightarrow Top$$

In one embodiment, the Path Weight (PW), for a node N, for a specific path is calculated as follows:

$$PW = (Dist\ to\ Top/Total\ Dist) * Nearest\ Weight \quad \text{Equation 1}$$

where

Dist(ance) to Top—is the number of concepts from N (including node N itself if it is a concept) to the Top Node, Total Dist(ance)—is the total number of concepts from the designated node to the Top Node (including the designated node) taking a path that includes node N, and Nearest Weight—is either the assigned weight of node N, if a weight was assigned, or the weight of the next highest node in the path that has a node weight or an assigned weight. In this exemplary algorithm, node weights are not computed for placeholder nodes, thus a placeholder node will contribute a weight only if a weight is assigned to it, as for example with Placeholder I which has an assigned weight of 3 and Top which has an assigned weight of 0.25.

After the set of path weights (PW) are calculated for a concept its node weight (NW) is taken as the largest of the calculated path weights. In the case that there is only one path from a node to Top then only a single path weight is computed and the path weight and node weight are the same.

Table 2 below presents the calculations performed for each concept in the example.

Figure 6:
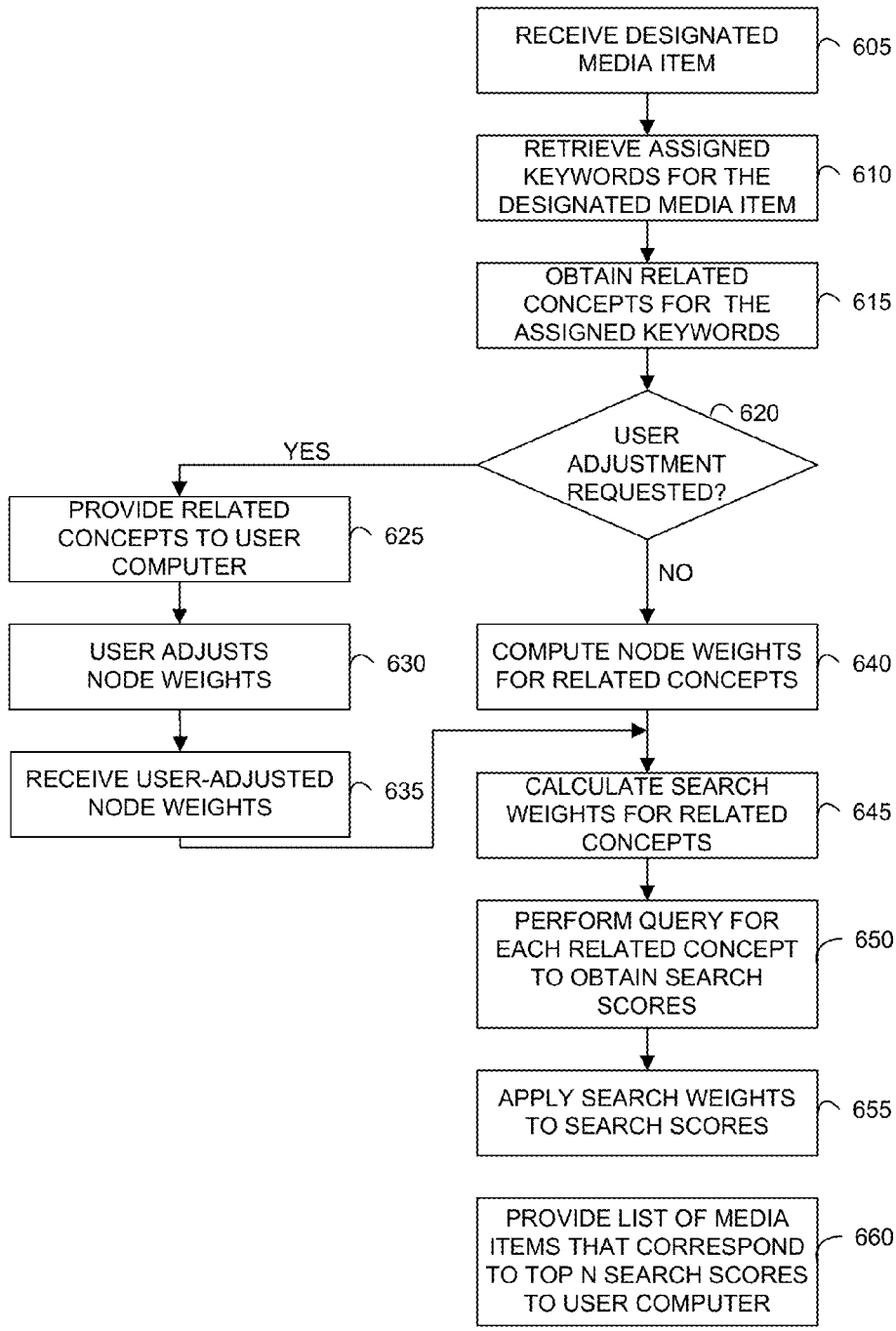
FIG. 6 is an overall flow diagram that depicts the steps performed by a DMS to identify media items similar to a designated digital media item from a media library.
Figure 8:
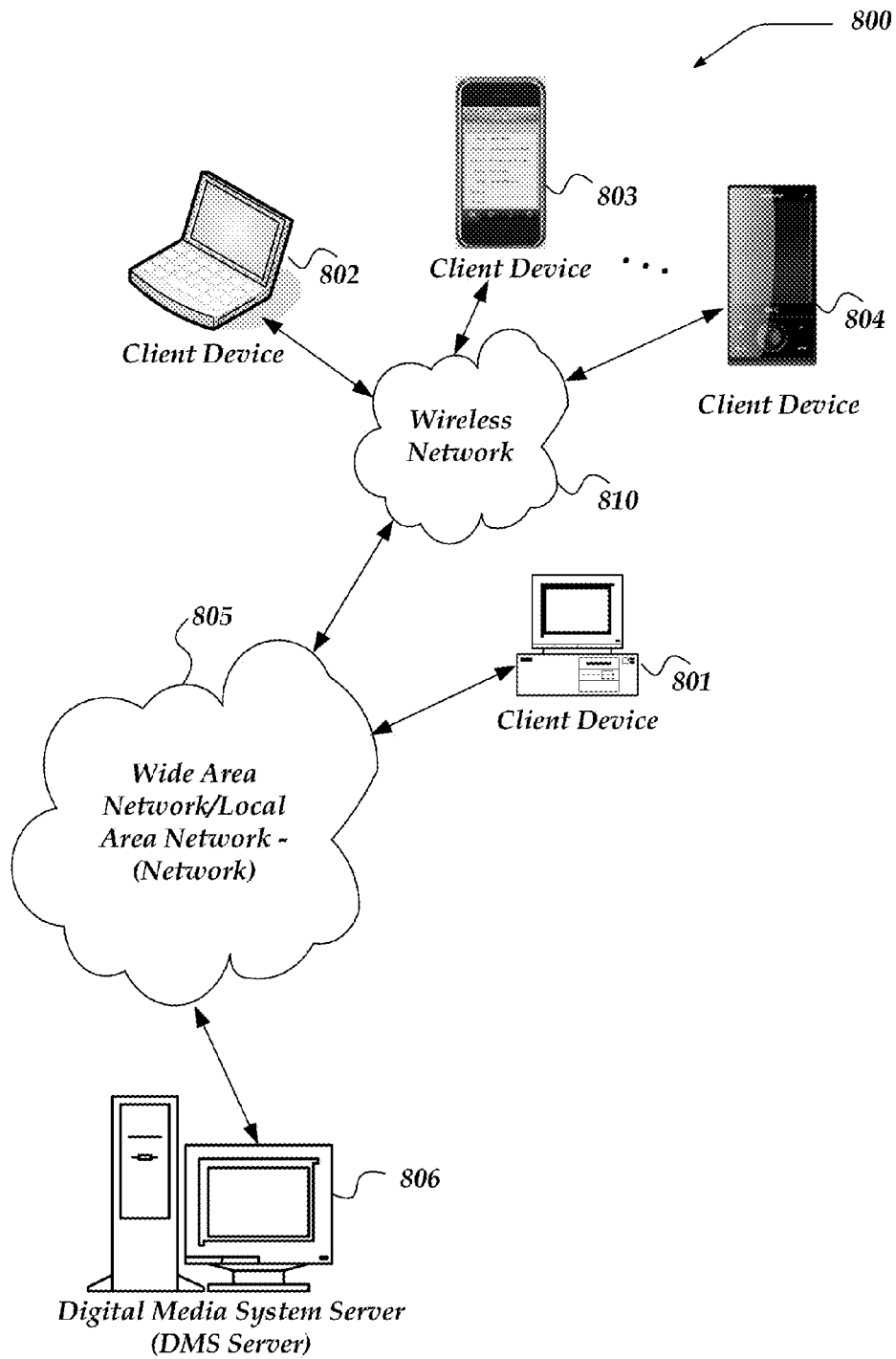
FIG. 8 is a system diagram that shows components of one exemplary environment in which the invention may be practiced.
Figure 9:
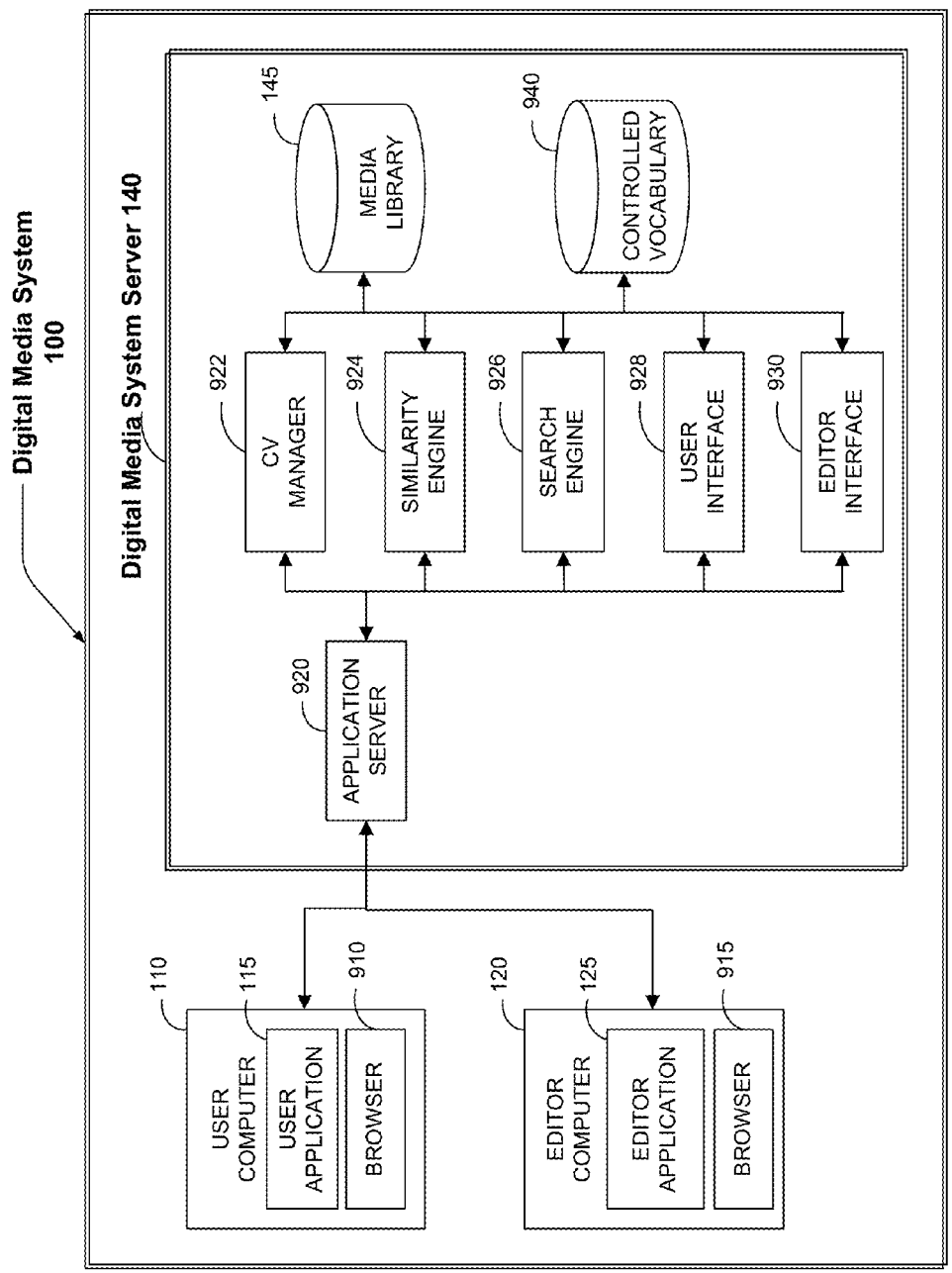
FIG. 9 is block diagram of the exemplary software modules of a digital media system server.

FIGS. 6, 8 and 9 are flowcharts and component diagrams in which each graphical element, including rectangles, cylinders, and triangles, can be implemented by computer program instructions. These program instructions may be provided to a processor and then executed by the processor, thus creating means for implementing the actions represented by the graphical element. The computer program instructions may be executed by a processor to cause a series of operational steps to be performed by the processor to produce a computer-implemented process such that the instructions, which execute on the processor to provide steps for implementing the actions represented by the graphical element. Some of the computer program instructions may be performed in parallel, or across more than one processor, such as might arise in a mufti-processor computer system. In addition, the actions represented by one or more graphical elements may also be performed concurrently with actions represented by other graphical elements, or even in a different sequence than illustrated without departing from the scope or spirit of the invention. It will also be understood that the actions represented by each graphical element and by combinations of graphical elements can be implemented by special purpose hardware that performs the specified actions or steps, or combinations of steps.

FIG. 6 is an overall flow diagram that depicts the steps performed by a DMS to identify media items similar to a designated digital media item from a media library. The method, also referred to herein as the more-like-this (MLT) algorithm, begins at step 605 when a designated media item is received by DMS server 140 from user computer 110. Typically the media item is designated as a result of a selection made by a user using user application 115. At step 610 DMS server 140 retrieves all keywords that have previously been assigned to one or more metadata fields in the record in media library 145 that corresponds to the designated media item. In a preferred embodiment, keywords are assigned to one of three metadata fields in each record, named ConceptsHigh, ConceptsNormal, and ConceptsLow, as depicted in Table 1. As previously discussed, keywords are typically assigned by an editor but may be assigned in other ways as well. In another embodiment, there is only a single metadata field for assigned keywords.

At step 615 DMS server 140 obtains, or harvests, all related concepts from the CV tree for each assigned keyword. It may be appreciated that each assigned keyword uniquely corresponds to a concept in the CV tree. It may further be appreciated that there may be several keywords that correspond to a single concept. For example, there may be several synonyms for each concept and there may be keywords in various natural languages; while, in a preferred embodiment, concepts and the CV tree are language independent. One embodiment of this step is described in further detail hereinbelow in step 720 of FIG. 7A.

At step 620 a determination is made as to whether user adjustment of node weights for concepts has been requested. For example, the request to adjust weights may be made by a user by selecting a control provided by user application 115. If user adjustment is requested, then at step 625 DMS server 140 provides the related concepts obtained in the preceding step, which include concepts that correspond to assigned keywords and to harvested concepts to user computer 110. Then, at step 630 the user adjusts the node weights for the concepts, typically using a user interface such as user interface 320. Next, at step 635 DMS server 140 receives the adjusted node weights from user computer 110.

If a determination is made at step 620 that user adjustment of node weights is not requested, then the process flows to step 640 where DMS server 640 computes node weights for each related concept. In a preferred embodiment, DMS server 640 employs the algorithm described with reference to FIG. 5 at this step. Other algorithms for computing node weights may also be used without departing from the scope and spirit of the subject invention. An example of this step is described in further detail hereinbelow in steps 730 and 740 of FIG. 7B.

At step 645, once node weights have been adjusted, either by DMS server 140 or as a result of a user adjusting the node weights, DMS server 140 calculates search weights, based on the node weights, for each metadata field to be searched. One embodiment of this step is described in further detail hereinbelow in steps 750 and 760 of FIG. 7B.

At step 650 DMS server 140 performs a query of media library 140 to identify all media items that are similar, or relevant, to the designated media item. Essentially, at this step DMS server 140 formulates and executes a query for each keyword to be searched across each metadata field of interest in each media item in media library 145. In the example given in FIGS. 7A-C the metadata fields ConceptsHigh, ConceptsNormal, ConceptsLow, Title and Caption are searched. In one embodiment, for each media item searched a score is returned by a search engine that indicates the relative confidence or the relevance of the media item to the query.

At step 655, DMS server 140 applies, typically by multiplying, the search weight computed for each field by its score to obtain a single search score for each media item searched. Thus, the media items can be ranked in terms of the weighted search score computed at this step. It may be appreciated by one skilled in the art, that steps 650 and 655 may be combined in certain embodiments. For example, when the Apache LUCENE search engine is used to perform the query of step 650 it is possible to formulate a single compound query that searches each metadata field in a record; further it is possible to specify in the query a "boost" value that corresponds to a search weight for each metadata field to be evaluated in the query. Thus, it is possible to formulate and perform a query that effectively performs steps 650 and 655. Other search engines provide comparable capabilities that enable combination of these two steps as well.

At step 660 DMS server selects the top N search scores generated at the previous step and provides a list of the N corresponding media items, typically in the form of thumbnail images to user computer 110 for display to the user.

Figure 7A:
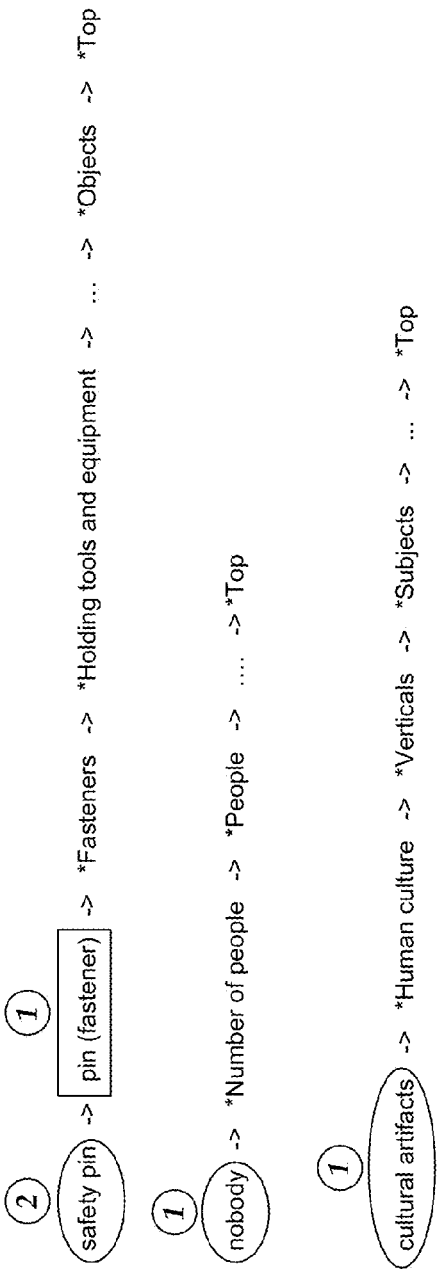

FIGS. 7A-C provide an example of selected steps performed by a DMS to formulate search requests to a search engine in order to identify digital media items that are similar to a designated digital media item. At step 700 of FIG. 7A, DMS server 140 receives a designated media item, which in this example is a digital image that depicts a safety pin. This corresponds to step 605 of FIG. 6.

To simplify the explanation of this example, the terms keyword and concept are used interchangeably in some cases with the understanding that each keyword corresponds to a single concept in the CV tree maintained by DMS server 140.

At step 710 DMS server 140 retrieves the assigned keywords from the ConceptsHigh, ConceptsNormal and ConceptsLow fields of the record in media library 145 that corresponds to the designated media item. As indicated, the keyword "safety pin" is assigned to the ConceptsHigh field, the keyword nobody is assigned to the ConceptsLow field and the keyword "cultural artifacts" is assigned to the ConceptsNormal field.

At step 720, DMS server 140 retrieves, or harvests, all concepts related to the designated media item that depicts a safety pin. This step corresponds to step 615 of FIG. 6. Essentially, at this step, DMS server 140 identifies a subtree of the CV tree for each of the assigned keywords. In the example depicted at step 720, there is a single path from each of the assigned keywords to the Top node in the CV tree. Since both the CV tree and the MLT algorithm support poly-hierarchy, it is possible that one or more of the subtrees includes multiple paths, as in the example depicted in FIG. 5. In the example depicted in step 720 only one additional related concept, "pin (fastener)" is retrieved.

At step 730 of FIG. 7B, DMS server 140 retrieves assigned weights for nodes in any of the subtrees identified in the previous step. In this example, the only assigned weights correspond to the placeholder nodes named people, top, and objects.

Then, at step 740 node weights are computed for each of the concepts retrieved at step 720. In one embodiment, the algorithm described with reference to FIG. 5 is used to compute node weights. It may be noted that there is only a single path from each harvested concept to the Top thus the path weights and node weights are the same for each concept. In other embodiments, other algorithms may be used to determine node weights; thus the invention does not depend on a single algorithm for computing node weights.

At step 750 of FIG. 7C search-from weights and search-to weights are retrieved. In one embodiment, these weights are included in a configuration file stored by DMS server 140 such as the example configuration file depicted in FIG. 4B. The search-from weights are used to weight the importance of keywords stored in the ConceptsHigh, ConceptsNormal, and ConceptsLow fields of the designated media item. The search-to weights are used to weight the importance of keywords stored in the corresponding fields of the media item being searched.

At step 760 search weights are computed for each assigned and harvested concept related to the designated media item. For example, in Table 760a search weights are computed for the concept "safety pin" for each of the five metadata fields to be searched (ConceptsHigh, ConceptsNormal, ConceptsLow, Title and Caption). In this embodiment, the search weight is computed as (search-from+search-to/2)*node weight. Thus, since the keyword "safety pin" was assigned to the ConceptsHigh field in the designated field it's search-from weight is 3. The search-to weight from the corresponding search to field is then used in the computation. The node weight for "safety pin" was previously computed as a one (1) in step 740. Table 760b provides an example of the computation of search weights for the concept "Cultural Artifacts" for each of the five metadata fields to be searched (ConceptsHigh, ConceptsNormal, ConceptsLow, Title and Caption). While the preferred method for computing search weights described herein uses a weighted average, it may be appreciated by one skilled in the art that there are many possible ways to compute search weights without departing from the scope and spirit of the subject invention.

As an example of a query for an Apache LUCENE search engine that might be generated and performed at step 650 of FIG. 6 for the example of FIG. 7 is given below:

ConceptsHigh:"safety pin"^3 OR ConceptsNormal: "safety pin"^2.5 OR ConceptsNormal:"safety pin"^2 OR Title:"safety pin"^1.75 OR Caption:"safety pin"^1.625

In this example query, five metadata fields are evaluated with this single query for a single related concept, safety pin, and the score, returned by the search engine for each field that is evaluated, is weighted, or boosted, by the appropriate search weight given in Table 760a. The search weight is added for each field using the "^" operator. Thus, this query effectively performs both steps 650 and 655 of the MLT algorithm presented in FIG. 6.

FIG. 8 is a system diagram that shows components of one exemplary environment in which the invention may be practiced. Not all of the components may be required to practice the invention, and variations in the arrangement and types of the components may be made without departing from the spirit or scope of the invention. As shown, system 800 of FIG. 8 includes wide area network ("WAN")/local area network ("LAN")-(network) 805, wireless network 810, client devices 801-804, and a DMS server (DMS server) 806.

User computer 110 and editor computer 120 are embodiments of client devices 801-804 which may connect to either or both of wireless network 810 or network 805. Network 150 is an embodiment of wireless network 810, network 805, or a combination of both. Further, DMS server 140 is an embodiment of DMS server 806.

Generally, client devices 801-804 include any computing devices that are capable of receiving and sending messages over a network, such as network 805 or wireless network 810 including, network PCs, or the like. Client devices 801-804 include personal computers, multiprocessor systems, microprocessor-based or programmable consumer electronics, mobile devices such as mobile telephones, smart phones, display pagers, tablet computers, handheld computers, laptop computers, wearable computers, or the like.

A Web-enabled client device can communicate across the Web. It may include a browser application that is configured to receive and to send web pages, web-based messages, or the like. The browser application may send, receive and display graphics, text, multimedia, or the like, employing a network protocol such as Hypertext Transfer Protocol (HTTP) and/or wireless application protocol (WAP).

Client devices 801-804 may include client application programs that send and receive content to/from other computing devices. Examples of application programs include calendars, browsers and email clients and so forth. Client devices 801-804 may be configured to include an application program that enables a user to search for, browse, select, negotiate pricing and pay for licenses media items in cooperation with a DMS server such as DMS server 806. Client devices 801-804 may also be configured to include application programs used by a editor, a contributor of media items, or a user for the purpose of licensing media items, in cooperation with a DMS server such as DMS server 806, such as those described herein.

Wireless network 810 is configured to couple client devices 802-804 with network 805. Wireless network 810 may include any of a variety of wireless networks that provide a connection for client devices 802-804. Such networks may include mesh networks, wireless LAN (WLAN) networks, cellular networks, or the like. Wireless network 810 may further include network devices such as gateways routers, or the like. In essence, wireless network 610 may include virtually any wireless communication device or mechanism by which enables information to travel between client devices 602-604 or another computing device, network, or the like.

Network 805 is configured to couple DMS server 806, and client device 801 with other computing devices, including through wireless network 810 to client devices 802-804. Network 805 may include the Internet in addition to local area networks (LANs), wide area networks (WANs), direct connections, combinations thereof or the like.

DMS server 806 represents a network computing device that is configured to enable a content contributor to upload media items, a user to search a digital media library, select media items, license and pay for selected media items, and a editor to negotiate prices for licenses. Devices that may operate as DMS server 806 include, but are not limited to personal computers, desktop computers, multiprocessor systems, microprocessor-based or programmable consumer electronics, network PCs, servers, network appliances, and the like.

DMS server 806 includes a communications interface, or network adapter that enables it to communicate across network 805.

Although DMS server 806 is illustrated as a distinct network device, the invention is not so limited. For example, a plurality of network devices may be configured to perform the functions of DMS server 806. One such configuration is a "server farm" that includes multiple server computers operating cooperatively, each performing some of DMS server 806 server functions. One embodiment of the software modules that perform DMS server 806 server functions is described with reference to FIG. 9 below.

DMS server 806 functions may also be provided by a cloud computing facility in which the services, features and functions ascribed herein to DMS server 806 are delivered as a service over a network, such as the Internet, rather than by a specific server or cluster of servers.

DMS server 806 is capable of running application programs ("applications"). Applications that may be run by DMS server 606 include transcoders, database programs, customizable user programs, security applications, encryption programs, VPN programs, web servers, applications servers, account management systems, and so forth.

DMS server 806 typically provides web services which include any of a variety of network services that are configured to provide content, including messages, over a network to another computing device. Thus, web services include for example, an application server, a web server, a messaging server, a File Transfer Protocol (FTP) server, a database server, a content server, or the like. Web services may provide the content including messages over the network using any of a variety of formats, including, but not limited to WAP, HDML, WML, SGML, HTML, XML, cHTML, xHTML, JSON, SOAP or the like. Web services may also include server-side scripting languages such as PHP, Python, and Java servlets. Web services may also include the server side of the Ajax web development method that enables a server to asynchronously respond to Ajax requests.

DMS server 806 includes non-transitory, or non-volatile, data storage for storing program code and data. Data storage may include virtually any mechanism usable for storing and managing data, including but not limited to a file, a folder, a document, a web page or an application, such as a database, digital media including digital images and digital video clips, and the like.

Data storage may further represent a plurality of different data stores. For example, data storage may represent a media library such as media library 145, and a controlled vocabulary such as those described below in conjunction with FIG. 9. Further, data storage may also include network storage or cloud storage in which the physical storage media is accessed across a network.

FIG. 9 is block diagram of the exemplary software modules of user computer 110, editor computer 120 and Digital Media System Server (DMS server) 140.

As discussed above with reference to FIG. 1, a user interacts with user computer 110 via user application 115. In a preferred embodiment, user application 115 is a Web application, that is it is written using standard Web programming languages such as HTML, JAVASCRIPT, and JAVA, and is executed by a browser 910 that runs in user computer 110.

Browser 910 is typically a standard, commercially available, browser such as MOZILLA FIREFOX or MICROSOFT INTERNET EXPLORER. Alternatively, it may also be a client application configured to receive and display graphics, text, multimedia, and the like, across a network.

In one embodiment, browser 910 includes or works in conjunction with a client-side scripting engine that executes client-side scripting instructions written in a client-side scripting or programming language such as JAVASCRIPT® from ORACLE CORPORATION of Redwood Shores, Calif., the Java open source programming language, ACTIVEX® from the MICROSOFT CORPORATION of Redmond, Wash., and the like. In one embodiment, browser 910 is configured to use the Ajax (asynchronous JavaScript and XML or JSON) web development techniques that are used to create interactive web applications. Rather than referring to a specific standard or product, the term Ajax represents a broad group of web technologies that are used to implement a Web application that communicates with a server in the background, without interfering with the current state of a web page. Ajax enables browsers to asynchronously request incremental pieces of information from the server instead of whole pages. Ajax typically works with XML or JavaScript Object Notation (JSON) and a client-side scripting language such as JavaScript or ActiveX.

In one embodiment, when a user accesses DMS server 140 using user application 115, DMS server 140 downloads web pages in HTML format to browser 910 for viewing and interactive use. To perform some of the advanced client-side interactive functions, described with respect to FIGS. 3A-B, the web pages may include client-side scripting instructions. Typically, such client-side scripting instructions are embedded in HTML web pages and are interpreted or executed by a client-side scripting engine to perform functions not available through HTML commands such as advanced graphics, database access, and computations.

In one embodiment, JAVASCRIPT is used as a client-side scripting language. JavaScript is supported by most commercial browsers including MOZILLA FIREFOX, MICROSOFT INTERNET EXPLORER AND APPLE SAFARI. For purposes of specificity, all of the client-side capabilities described herein can be accomplished using browser 910 or browser 915 in conjunction with JAVASCRIPT Version 1.5, or greater.

In one embodiment, browsers 910 and 915 issue hypertext transfer protocol (HTTP) requests to and receive HTTP responses from an application server 920 running in DMS server 140.

Application server 920 receives the HTTP requests and invokes the appropriate DMS server software module to process the request. Application server 920 may be a commercially available application server that includes a web server that accepts and processes HTTP requests transmits HTTP responses back along with optional data contents, which may be web pages such as HTML documents and linked objects (images, or the like). In addition, browsers 910 and 915 may use Ajax to issue requests for XML or JSON-coded information that is delivered asynchronously by application server 920. Henceforth, the term request message will refer to a message sent by browser 910 or 915 using HTTP, Ajax or other client-server communications method to DMS server 140. And a response message will refer to a message sent in response, typically using the same communications method, by application server 920 running in DMS server 140.

Application server 920 establishes and manages user and editor sessions. Typically application server 920 assigns each session a unique session id. A session lasts from the time a user (i.e. a user or editor) logs in, or accesses DMS server 140, until the time the user logs out or stops interacting with DMS server 140 for a specified period of time. In addition, application server 920 typically manages server applications and provides database connectivity.

Upon request by browser 910 or 915, application server 920 downloads to user computer 110 or editor computer 120 the HTML, JavaScript and other browser-executable code that make up user application 115 or editor application 125, respectively.

DMS server 140 includes a CV manager 922, a similarity engine 924, search engine 926, a user interface 928, and an editor interface 930. DMS server 140 further includes two databases: a media library 145, and a controlled vocabulary database 940. It may be appreciated that each of the above-mentioned databases may be implemented as one or more computer files spread across one or more physical storage mechanisms. In one embodiment, each of the abovementioned databases is implemented as one or more relational databases and is accessed using the structured query language (SQL).

CV manager 922, similarity engine 924, search engine 926, user interface 928, and editor interface 930 may each include, or may share the use of, a commercial database management system (DBMS) to access and search for data and objects that reside in the database. In a preferred embodiment, the DBMS is a relational DBMS (RDBMS) such as ORACLE® from the Oracle Corporation, SQL SERVER from the Microsoft Corporation, or the like. However, other database managers may also be used. In addition to a RDBMS, a standard data extraction tool may be included that simplifies access to relational databases, enabling a developer to express queries visually or in a simplified manner, rather than using structured query language (SQL).

CV manager 922 is responsible for managing the controlled vocabulary stored in controlled vocabulary database 940. CV manager 922 may include tools for applying rules to ensure consistency and coherence across the controlled vocabulary.

Similarity engine 924 performs the MLT algorithm described with reference to FIG. 6. Essentially, it performs all the steps necessary to identify and retrieve media items that are similar to a designated media item.

Search engine 926 receives search queries generated by similarity engine 924 and performs the queries against records stored in media library 145 to identify all media items that satisfy the queries. In one embodiment an open source database such as the LUCENE database provided by the Apache Software Foundation is used as search engine 926. Typically, one or more queries are formulated and provided to search engine 926 for each record to be searched and search engine 926 returns a numerical score that indicates how closely the record satisfies the query. For example, if search engine 926 returns scores in the range of 0 to 100 to indicate the degree of match then a 0 indicates that the query is not satisfied and 100 indicates that the query is definitely satisfied. In one embodiment, search weights computed by similarity engine 924 for each field in a record to be searched are provided to search engine 926 to boost the search scores.

User interface 928 responds to requests from user application 115, i.e. it performs the back-end server processing. User interface 928 enables a user to perform functions such as searching and browsing media items in media library 145, selecting a media item and requesting similar media items, and adjusting concept weights. User interface 928 responds to requests for information about media elements listed in media library 145 by querying media library 145. In one embodiment, upon request, user interface 928 transmits web pages, scripts and other elements to user computer 110 for use by user application 115.

Editor interface 930 responds to requests from editor application 125, i.e. it performs the server processing corresponding to the client processing performed by editor application 125. Editor interface 930 enables a editor to log in, review and edit information about media items and to edit elements of the controlled vocabulary. Editor interface 930 provides user interface elements and information to editor application 125. In one embodiment, upon request editor interface 930 transmits web pages, scripts and other elements to editor computer 120 for use by editor application 125.

In the discussion hereinbelow concerning databases it may be appreciated by one skilled in the art that each database may be implemented as one or more database files, alternatively two or more of the databases may be implemented as a single database file. Further the term database may refer to a relational database file that is accessed by a relational database manager or it may implemented as a B-tree, R-tree, spreadsheet, flat file, comma separated value any other type of suitable data structure stored within one or more computer files.

Media library 145 stores records for each digital media item listed in the catalog. As previously described, in one embodiment, each media item is described by a database record that includes fields such as those listed and described above in Table 1.

In another embodiment, the fields listed in Table 1 are stored as a relational table using a relational database management system where the Unique ID field serves as the key. In one embodiment, a media item such as a digital image, or digital music file, may be stored within the database or databases that implement media library 145, or separately, e.g. in the local file system, or in remotely accessible network storage. Alternatively, DMS server 140 may not store or manage access to the media item at all. The media item may be stored by content provider 130 or by another entity in which case the Access Info field of media library 145 provides information about how to access the media item.

Controlled vocabulary database 940 stores a data structure along with the associated data that implements a controlled vocabulary tree. In addition, controlled vocabulary database 940 includes various weights and other information. For example, controlled vocabulary database 940 may include synonyms for concepts and placeholders and may include translations of various elements into different languages.

The above specification, examples, and data provide a complete description of the manufacture and use of the composition of the invention. Since many embodiments of the invention can be made without departing from the spirit and scope of the invention, the invention resides in the claims hereinafter appended.

TABLE 2

Calculation of Weights For Concepts in FIG. 5

| Concept | Path | Dist to Top | Total Dist | Nearest Weight | Path Weight (PW) | Node Weight (NW) |
|---|---|---|---|---|---|---|
| A | K-J-I-F-C-A-Top | 1 | 4 | 0 | 0 | 0 |
| D | K-J-I-G-D-B-Top | 1 | 3 | .25 | .0833 | .0833 |
| E | K-J-I-H-E-B-Top | 1 | 4 | .25 | .0625 | .0625 |
| F | K-J-I-F-C-A-Top | 2 | 4 | 0 | 0 | 0 |
| H | K-J-I-H-E-B-Top | 2 | 4 | 1 | .5 | .5 |
| J | K-J-I-F-C-A-Top | 3 | 4 | 3 | 1.5 | |
|   | K-J-I-G-D-B-Top | 2 | 3 | 3 | 2 | 2 |
|   | K-J-I-H-E-B-Top | 3 | 4 | 3 | 1.5 | |
| K | K-J-I-F-C-A-Top | 4 | 4 | 3 | 3 | 3 |
|   | K-J-I-G-D-B-Top | 3 | 3 | 3 | 3 | |
|   | K-J-I-H-E-B-Top | 4 | 4 | 3 | 3 | |

Notes:
Dist to Top is the number of concepts in the path from the node being computed to Top
Total Dist is the total number of concepts in the path that includes the node being computed from the designated node to Top
Nearest weight is the next node in the path to Top that either has a node weight or an assigned weight
Path weight is computed as (Dist to Top/Total Dist) * Nearest Weight
Weight is the largest of the Node Weights computed for the concept.

What is claimed is:

1. A computer-implemented method of identifying matching media items:
   storing by a media server (i) a controlled vocabulary which is represented as a hierarchically linked set of nodes wherein a plurality of nodes are concept nodes that correspond to concepts, wherein a concept is a text description that corresponds to one or more keywords, and wherein each node, except for the top node, has a parent node, and wherein the distance between a first node and a second node is the number of parents in a path from the first node to the second node and wherein concept nodes that are closer to the top node correspond to concepts that have broader meanings than concepts that correspond to concept nodes that are further from the top node, and (ii) a library of media items, said media library including a database of records for each media item, wherein each record includes at least one metadata field that includes at least one assigned keyword and wherein each assigned keyword in a metadata field corresponds to a concept in the controlled vocabulary;
   receiving, by the media server, a designation of a media item from a user computer;
   retrieving, by the media server, from the record in the media library that corresponds to the designated media item, the at least one keyword assigned to the at least one metadata field;
   for each of the at least one assigned keyword:
      (i) obtaining, by the media server, all related concepts from the controlled vocabulary, wherein the related concepts for an assigned keyword include a concept that corresponds to the assigned keyword and each concept whose corresponding concept node is in a path from the node that corresponds to the assigned keyword to the top node;
      (ii) computing, by the media server, a search weight for each related concept wherein a search weight for a related concept is inversely related to the distance from the concept node corresponding to the related concept to the concept node that corresponds to the assigned keyword and wherein for at least one related concept there are multiple paths between the concept node that corresponds to the at least one related concept and the top node and a path weight is computed for each of the multiple paths wherein the path weight is proportional to the distance from the concept node corresponding to the at least one related concept to the top node and the search weight is further based on a weighted average of the multiple path weights;
      (iii) for each of the related concepts, querying, by the media server, at least one specified metadata field in each record in the library of media items to obtain a search score for the corresponding media item that measures how closely the related concept matches the contents of the at least one specified metadata field in the record for the corresponding media item; and
      (iv) for each obtained search score, applying, by the media server, the search weight to the obtained search score to obtain a weighted search score for the media item; and
   providing to the user computer a list of up to a specified number of the media items that obtained the top weighted search scores.

2. The method of claim 1 wherein weights are assigned to a plurality of nodes in the controlled vocabulary and wherein the search weight for a related concept is further based on at least one weight assigned to a node in the path from the node that corresponds to the related concept to the concept node that corresponds to the assigned keyword.

3. The method of claim 2 wherein a plurality of nodes are placeholder nodes and wherein a weight may be assigned to a placeholder node but no keywords or concepts are associated with a placeholder node.

4. The method of claim 1 wherein if multiple metadata fields in a record are queried then a search-to weight is assigned to each of the queried metadata fields and wherein the search weight is further based on the search-to weight of each of the queried metadata fields.

5. The method of claim 1 wherein if keywords are assigned to more than one metadata field in a record, then each of the metadata fields to which keywords are assigned has a search-from weight and wherein the search weight is further based on the search-from weight for each of the metadata fields to which keywords are assigned.

6. A server computer, comprising:

a processor;

a communication interface in communication with the processor;

a data storage for storing (i) a controlled vocabulary which is represented as a hierarchically linked set of nodes wherein a plurality of nodes are concept nodes that correspond to concepts, wherein a concept is a text description that corresponds to one or more keywords, and wherein each node, except for the top node, has a parent node, and wherein the distance between a first node and a second node is the number of parents in a path from the first node to the second node and wherein concept nodes that are closer to the top node correspond to concepts that have broader meanings than concepts that correspond to concept nodes that are further from the top node, and (ii) a library of media items, said media library including a database of records for each media item, wherein each record includes at least one metadata field that includes at least one assigned keyword and wherein each assigned keyword in a metadata field corresponds to a concept in the controlled vocabulary; and a memory in communication with the processor for storing instructions, which when executed by the processor, cause the server:

to receive a designation of a media item from a user computer;

to retrieve from the record in the media library that corresponds to the designated media item the at least one keywords assigned to the at least one metadata field;

for each of the assigned keywords:

(i) to obtain all related concepts from the controlled vocabulary, wherein the related concepts for an assigned keyword includes a concept that corresponds to the assigned keyword and each concept whose corresponding concept node is in a path from the node that corresponds to the assigned keyword to the top node;

(ii) to compute a search weight for each related concept wherein a search weight for a related concept is inversely related to the distance from the concept node corresponding to the related concept to the concept node that corresponds to the assigned keyword and wherein for at least one related concept there are multiple paths between the concept node that corresponds to the at least one related concept and the top node and a path weight is computed for each of the multiple paths wherein the path weight is proportional to the distance from the concept node corresponding to the at least one related concept to the top node and the search weight is further based on a weighted average of the multiple path weights;

(iii) to query, for each of the related concepts, at least one specified metadata field in each record in the library of media items to obtain a search score for the corresponding media item that measures how closely the related concept matches the contents of the at least one specified metadata field in the record for the corresponding media item; and (iv) to apply, for each obtained search score, the search weight to obtain a weighted search score for the media item; and to provide to the user computer a list of up to a specified number of the media items that obtained the top weighted search scores.

7. The server computer of claim 6 wherein node are assigned to a plurality of nodes in the controlled vocabulary and wherein the search weight for a related concept is further based on at least one weight assigned to a node in the path from the node that corresponds to the related concept to the concept node that corresponds to the assigned keyword.

8. The server computer of claim 7 wherein a plurality of nodes are placeholder nodes and wherein a weight may be assigned to a placeholder node but no keywords or concepts are associated with a placeholder node.

9. The server computer of claim 6 wherein if multiple metadata fields in a record are queried then a search-to weight is assigned to each of the queried metadata fields and wherein the search weight is further based on the search-to weight of each of the queried metadata fields.

10. The server computer of claim 6 wherein if keywords are assigned to more than one metadata field in a record, then each of the metadata fields to which keywords are assigned has a search-from weight and wherein the search weight is further based on the search-from weight for each of the metadata fields to which keywords are assigned.

* * * * *